DRIP RECEPTACLE AND METHOD OF USING THE SAME

Original Filed Oct. 20, 1965

INVENTOR.

RICHARD O. BARTZ

United States Patent Office

Re. 27,449
Reissued Aug. 1, 1972

27,449

DRIP RECEPTACLE AND METHOD OF USING THE SAME

Richard O. Bartz, 7017 Mark Terrace Drive, Edina, Minn. 55435

Original No. 3,410,438, dated Nov. 12, 1968, Ser. No. 498,489, Oct. 20, 1965. Application for reissue Aug. 17, 1970, Ser. No. 64,330
Int. Cl. B65b *1/04, 3/04*
U.S. Cl. 141—1 10 Claims

Matter enclosed in heavy brackets [ ] appears in the original patent but forms no part of this reissue specification; matter printed in italics indicates the additions made by reissue.

ABSTRACT OF THE DISCLOSURE

A container for collecting and storing liquid having a flat bottom and a flat lower end wall for selectively supporting the container in prone and erect positions. A funnel-shaped section formed in the upper end of the top wall has a downwardly directed tubular threaded extension located contiguous to the upper end of the wall. The extension has a passage opened into the container adapted to be closed with a thread cap. An outwardly directed ridge surrounds the funnel-shaped section. The upper end wall has a handle and a normally closed drain opening.

SUMMARY OF INVENTION

This invention relates to a receptacle for collecting liquids and storing the collected liquids for later use or disposal. More particularly the receptacle of this invention is a unitary drip pan or container having a top wall section for collecting liquid as it drains from an engine and a reservoir chamber for receiving and storing the collected liquid.

Briefly stated the drip receptacle is a do-it-yourself servicing item used in changing of oil and/or antifreeze from an engine, such as an engine in an automobile, truck, tractor, lawn mower and the like. The receptacle is a liquid collecting and storing container comprising a relatively flat vessel which can be placed under an engine to collect liquids draining from the engine. The top wall of the container has a funnel-shaped section having a passage open to a reservoir within the container. The bottom wall and the lower end wall of the container are flat and normally disposed to each other, allowing the container to stand on its side and end without spilling liquid from the container.

Figure 1:
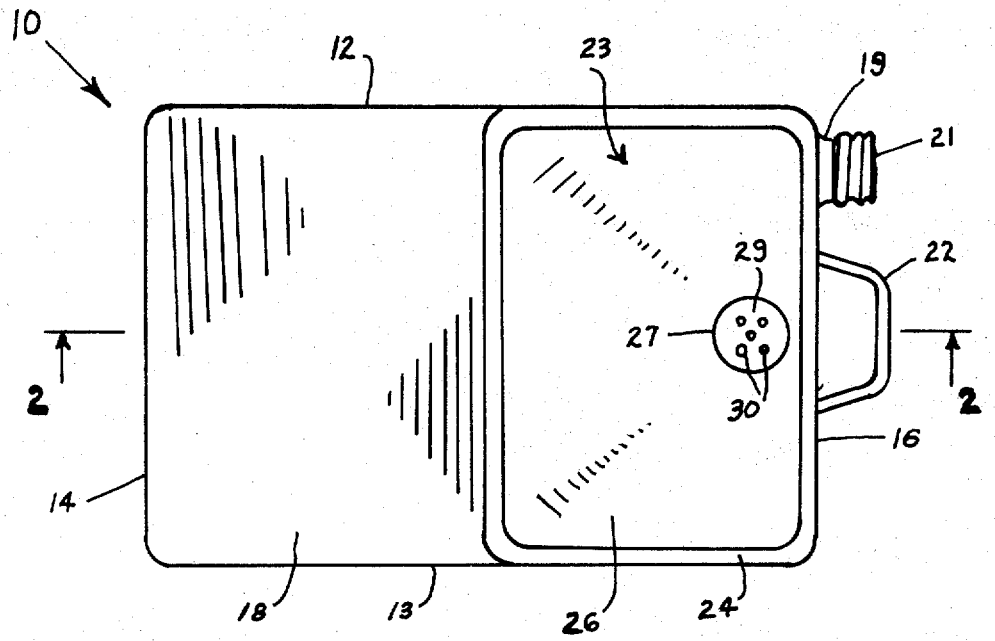
FIGURE 1 is a plan view of the top of the receptacle of this invention.
Figure 2:
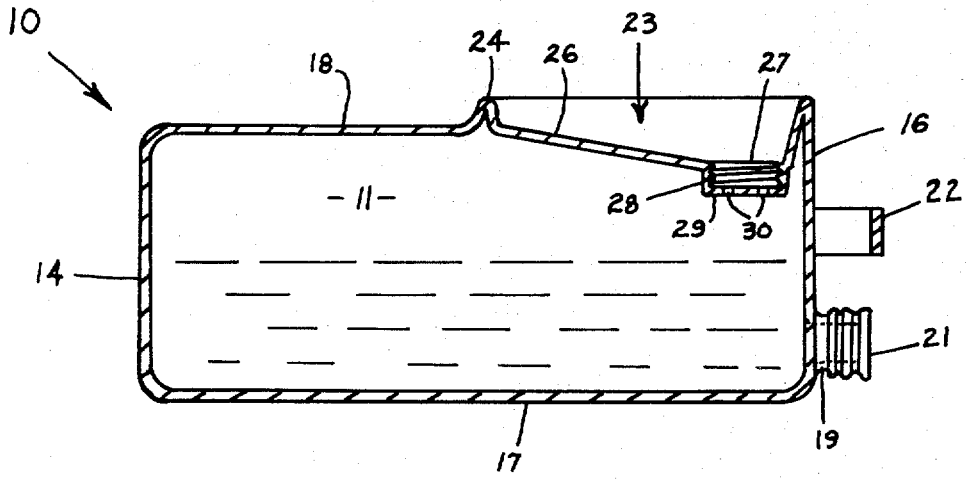
FIGURE 2 is a sectional view taken along the line 2—2 of FIGURE 1.

Referring to the drawing there is shown the receptacle of this invention indicated generally at 10. The receptacle is a rectangular box-shaped container or vessel formed from sheet-like material, as sheet metal, metal-plastic, lithograph metal, plastic or the like. Receptacle 10 has a liquid storing chamber or reservoir 11 defined by flat side walls 12 and 13, flat end wall 14, end wall 16, flat bottom wall 17 and top wall 18 all secured together forming a one-piece article.

The flat end wall 14 is normally disposed relative to the flat bottom wall 17 so that receptacle 10 can be placed on the ground or similar support surface in a horizontal position where the receptacle has a minimum height and alternatively in an upright position wherein the receptacle can be conveniently stored.

End wall 16 has a threaded tubular extension 19 closed by a removable cap 21. Extension 19 is located in one corner of end wall 16 adjacent bottom wall 17 and is normally used when cap 21 is removed as a discharge spout to drain liquid from the receptacle. Extension 19 may be located in the opposite lower corner of end wall 16 from the corner shown in the drawing. A U-shaped handle 22 is secured to and projects from the center area of the end wall 16.

Top wall 18 has a downwardly directed funnel-shaped section indicated generally at 23. Section 23 has an upright peripheral ridge 24 joined to a concave curved wall 26 which slopes downwardly to an apex portion having an opening or passage 27 into the reservoir 11. The ridge 24 has a rectangular outline. Ridge 24 can have an outline which is circular, semicircular as well as an irregular shaped outline. An inwardly projected threaded tubular extension 28 is secured by solder or the like wall 26 adjacent opening 27. A perforated disc 29 having a plurality of holes 30 is secured to the lower end of the extension 28. A screen may be used in lieu of perforated disc 29. When the receptacle is used to store liquid a cap (not shown) threads into extension 28 to close opening 27. This cap can be threaded into a sealed relationship with the extension 28.

In use, to drain oil from an engine receptacle 10 is placed under the engine with bottom wall 17 in engagement with the support surface. Passage 27 is open. In this position the receptacle has a minimum height permitting the receptacle to be placed under low machines, as lawn mowers and automobiles. The funnel section 23 is located under the engine drain plug. Using a wrench the drain plug is removed allowing the oil to flow onto the funnel section 23. Sloping wall 26 directs the oil to passage 27. The oil flows into reservoir 11 through holes 30 in disc 29. If the drain plug should inadvertently fall into funnel section 23 the plug will not drop into reservoir 11 by reason of the perforated disc 29.

After all the oil has drained from the engine receptacle 10 is pulled from under the engine by using handle 22. The collected oil can be stored and sealed in the receptacle 10 by turning the cap into extension 28. The receptacle can be set in an upright position on end wall 14 for convenient storage. Oil will remain in the receptacle even if the cap is not placed in extension 28 because passage 27 is located adjacent end wall 16.

The stored oil in reservoir 11 can be drained from receptacle 10 by removing cap 21 from extension 19 and using extension 19 as a spout. Passage 27 serves as an air inlet vent.

The invention is limited only by the prior art considered with the following claims.

I claim:

1. A receptacle for collecting and storing liquid comprising a generally flat container having a chamber defined by side walls, a flat bottom wall for supporting the container in a prone position to collect liquid, a first flat end wall normally disposed with respect to the bottom wall for supporting the container in an upright position to store liquid in the container, second opposite end wall, and a top wall, said top wall having a funnel-shaped section projected inwardly into said chamber and located adjacent said second end wall, said funnel-shaped section having an inwardly sloping wall formed with a first opening in the lowermost portion of the wall, a downwardly directed threaded tubular extension secured to said sloping wall forming a passage aligned with the first opening and open to said chamber, said extension located contiguous to said second end wall and having an open top to receive a threaded cap to close the first opening, an upright continuous ridge projected above the plane of the top wall and surrounding the top of said funnel-shape section, and second wall having second opening open to the bottom of the chamber, handle means secured to the second wall above the second opening, and removable means for closing the opening.

2. The receptacle defined in claim 1 further characterized by perforated means extended across said passage.

3. The receptacle defined in claim 1 further characterized by cap means for closing said first opening.

4. A receptacle for collecting and storing liquid comprising a generally flat container having a chamber defined by side walls, a flat bottom wall of supporting the container in a prone position to collect liquid, a first flat end wall normally disposed with respect to the bottom wall for supporting the container in an upright position to store liquid in the container, a second opposite end wall, and a top wall having a funnel-shaped section projected inwardly into said chamber and located adjacent said second end wall, said funnel-shaped section having an inwardly and [upwardly] *downwardly* sloping wall formed with a first opening in the lower most portion of the sloping wall, a downwardly directed tubular extension secured to said sloping wall forming a passage aligned with the first opening and open to said chamber, said extension located contiguous to said second end wall and having an open top to receive a cap to close the first opening, said second wall having a second opening open to the bottom of the chamber, handle means secured to second wall above the second opening and removable means closing the second opening.

5. The receptable defined in claim 4 further characterized by perforated means extended across said passage.

*6. A receptacle for collecting and storing liquid comprising: a generally flat container having a chamber defined by side walls, a generally flat bottom wall for supporting the container in a prone position to collect liquid, a first generally flat end wall normally disposed with respect to the bottom wall for supporting the container in an upright position to store liquid in the container, a second opposite end wall, and a top wall having a generally funnel-shaped section projected inwardly into said chamber, said funnel-shaped section having an inwardly and downwardly sloping wall with the lower most portion located in contiguous relationship with respect to the second end wall, said lower most portion having means adapted to be in communication with said chamber whereby liquid collected on the funnel-shaped section can flow into said chamber, said second wall having a second opening open to the chamber, removable means closing the second opening, and handle means secured to the second wall whereby the container can be carried in the upright position.*

*7. The receptacle defined in claim 6 further characterized by a generally upright continuous ridge surrounding the top of the funnel-shaped section.*

*8. A method of collecting and storing liquid drained from a machine having a drain outlet comprising the steps of: placing a generally flat container having a lower supporting end, a chamber for storing liquid, and a top wall with a funnel-like section having a wall sloping downwardly and toward the upper end of said container, the lowermost portion of said funnel-like section having at least one hole open to said chamber, aligning the funnel-like section of the container below the drain outlet of the machine so that the liquid drained from the machine will flow into the funnel-like section and through said hole into said chamber, removing the closure from the drain outlet of the machine to allow the liquid to drain into the funnel-like section, said liquid being directed by the funnel-like section to the hole and into the chamber of the container, removing the container from under the machine after the liquid has been drained from the machine, turning the container to an upright erect position for transportation and storage in the erect position.*

*9. The method of claim 8 including the step of: closing the hole in the funnel-like section after the container has been removed from under the machine.*

*10. The method of claim 8 including the step of: draining the collected liquid from the chamber through a normally closed opening in the upper end of the container.*

References Cited

The following references, cited by the Examiner, are of record in the patented file of this patent or the original patent.

UNITED STATES PATENTS

| | | | |
|---|---|---|---|
| 172,341 | 1/1876 | Pfeifer | 141—331 |
| 1,554,589 | 9/1925 | Long | 184—1.5 |

HOUSTON S. BELL, Jr., Primary Examiner

U.S. Cl. X.R.

141—98; 184—106; 220—1, 20, 86